Patented Aug. 17, 1926.

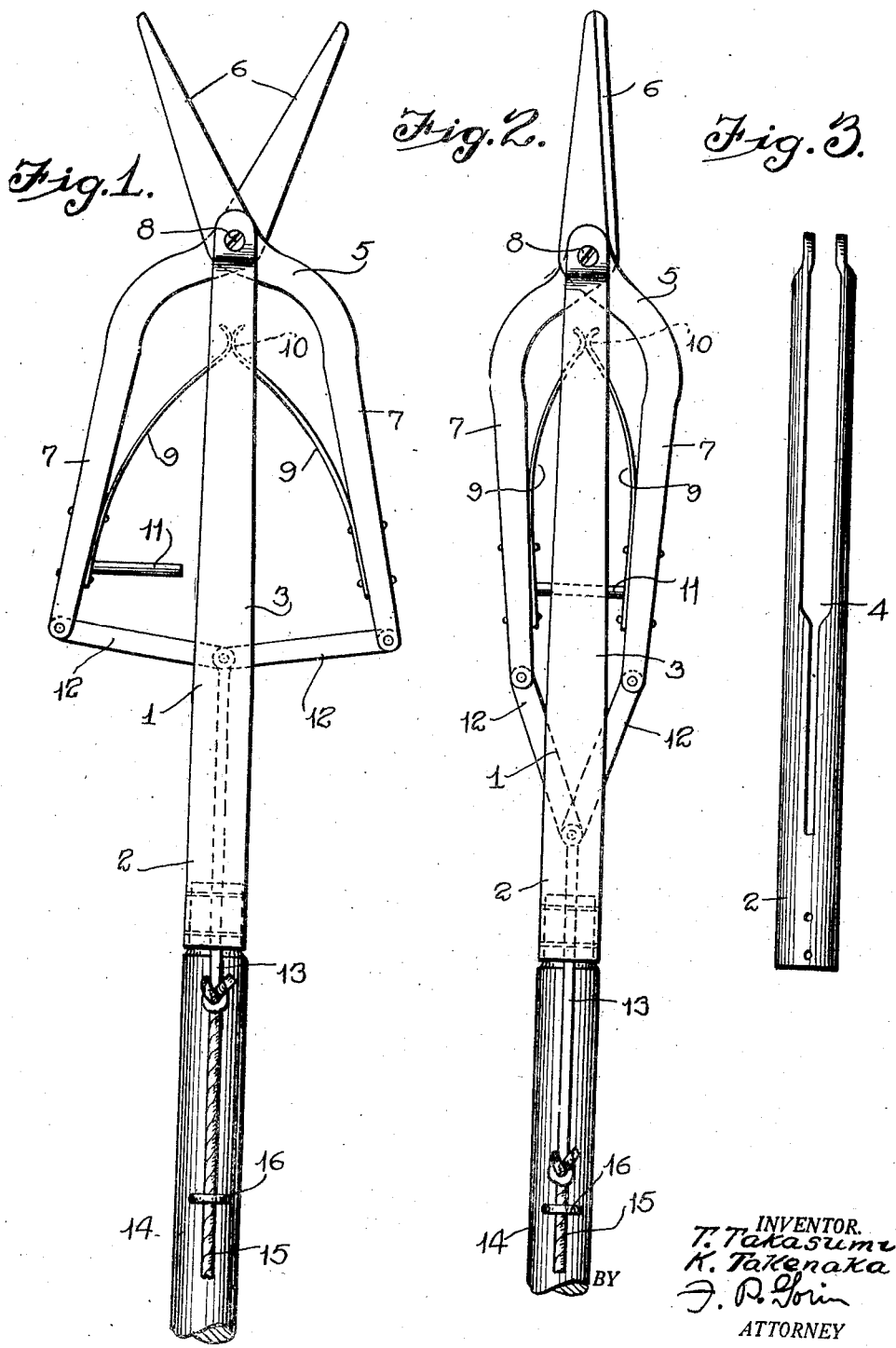

1,596,777

UNITED STATES PATENT OFFICE.

TOKUZO TAKASUMI AND KOZAEMON TAKENAKA, OF HOOD RIVER, OREGON.

FRUIT SHEARS.

Application filed June 20, 1925. Serial No. 38,540.

This invention relates to an improvement in fruit thinning shears, designed particularly for thinning standing fruit, such as apples or the like, the construction involving relatively movable blades, normally spring pressed to spread or open position, together with means whereby the blades may be brought into cutting cooperation at will.

The invention is illustrated in the accompanying drawings, in which:

Fig. 1 is a view in elevation of the shears with the blades open.

Fig. 2 is a similar view with the blades closed.

Fig. 3 is a side elevation of the upper portion of the support.

The improved fruit thinning shears comprises a support 1 preferably tubular at its lower portion at 2, and formed above such tubular portion as spaced extended sections 3, the meeting edges of these sections defining slots 4 which are preferably wider at their upper portions than at their lower portions.

Cutters 5 of scissors type involving blades 6 and handle portions 7 are pivotally supported upon a pin 8 which passes through the terminals of the sections 3, so that the scissor members are mounted for their usual operation. Leaf springs 9 are connected to the handle portion of each of the scissor members, these leaf springs extending upwardly with their rounded terminals 10 in contact between the sections 3. The springs function to normally hold the handle and blade portions in spaced or open relation. A stop pin 11 projects from one of the handle members, being of such a length that when the members are operated, the free end of the stop pin, passing between the sections 3, will engage the other handle member to limit the closing operation of the members.

The lower ends of the members 7 are connected by bars 12 to an operating bar 13, which passes vertically through the tubular portion 2 of the support 1. The support 1 is adapted to be fixed to a rod 14 of any desired length, and a flexible connector, such as a cord 15, extends longitudinally of this rod 14, preferably through guides 16, and is terminally connected to the operating bar 13.

Obviously, a pull upon the cord 15, the scissor members may be operated to a closed position, thus cutting the stem of the fruit or other article which has been placed between the cutting blade 6. Upon the release of the pull on the cord, the scissor members are opened by the springs 9.

What we claim is:—

In a fruit thinning shears, a support formed tubular at one end and to provide spaced portions beyond the tubular portion, the spaced portions including a narrow section and a wide section, scissor members pivotally supported between the free ends of the wide section, and operating rod moving longitudinally of the tubular portion, and bars terminally connected to the rod and to the inner ends of the scissor members, said bars playing at all times in the narrow portion of the space beyond the tubular member, and leaf springs terminally connected to the scissor members with their free ends in contact within the wide portion of the space above the tubular portion, the contacting ends of the springs being held against separation by those portions of the support defining the wide portion of the space above the tubular part.

In testimony whereof we affix our signatures.

TOKUZO TAKASUMI.
KOZAEMON TAKENAKA.